United States Patent [19]

Yoshida et al.

[11] Patent Number: 4,563,746
[45] Date of Patent: Jan. 7, 1986

[54] METHOD OF OPERATING POWER PLANTS

[75] Inventors: Kenichi Yoshida; Takao Watanabe, both of Hitachi; Takashi Kiguchi, Mito, all of Japan

[73] Assignee: Hitachi, Ltd., Tokyo, Japan

[21] Appl. No.: 433,908

[22] Filed: Oct. 12, 1982

[30] Foreign Application Priority Data

Oct. 14, 1981 [JP] Japan ................................ 56-164632

[51] Int. Cl.⁴ ............................................. G06F 15/46
[52] U.S. Cl. ..................................... 364/492; 364/551; 364/300
[58] Field of Search ............... 364/492, 415, 550, 551, 364/300; 376/216, 217

[56] References Cited

U.S. PATENT DOCUMENTS 4,290,114 9/1981 Sinay ..................................... 364/900
4,459,259 7/1984 Colley ............................. 364/492 X Primary Examiner—Edward J. Wise
Attorney, Agent, or Firm—Antonelli, Terry & Wands

[57] ABSTRACT

This invention refers to a plant operating method for overcoming an abnormal status of a plant. A plant data is detected from the plant, and all plant state members indicating an abnormality of the plant are identified from the plant data. The plant operating method includes estimating a cause whereby the plant status members are produced, predicting all plant status members arising after passing a given period of time according to the estimated cause, determining whether or not actual plant status members are present in the plant state members predicted and when the latter members are not present in the former members, repeatedly carrying out the processing of the steps of estimating and predicting to which the plant status members forecasted at the predicting step are inputted until all the actual plant status members come to exist in the plant status members forecasted at the predicting step. When all the actual plant status members are present in the plant status members predicted at the predicting step, a plant operation for overcoming the cause obtained at the step of estimating which produces the predicted plant status members is selected, and the plant operation is carried out according to the selected operation.

7 Claims, 32 Drawing Figures

FIG. 2

| IF PART | THEN PART |
|---|---|
| SEIZURE OF PRIMARY LOOP RECIRCULATION PUMP | VOID INCREASE<br>JET PUMP FLOW DECREASE |
| VOID INCREASE | REACTOR WATER LEVEL RISE |
| VOID DECREASE | REACTOR WATER LEVEL FALL |
| FEED WATER CONTROL SYSTEM FAILURE | FEED WATER LOW INCREASE |
| FEED WATER FLOW INCREASE | REACTOR WATER LEVEL RISE |
| REACTOR WATER LEVEL=L8 | TURBINE TRIP |
| TURBINE TRIP | SCRAM<br>SWITCH ELECTRIC BUS<br>REACTOR PRESSURE RISE |
| MOTOR DRIVEN REACTOR FEED PUMP TRIP | REACTOR WATER LEVEL LOW |
| REACTOR SCRAM(AFTER PREDETERMINEDTIME PASSED) | VOID DECREASE |
| REACTOR PRESSURE HIGH | TURBINE BYPASS VALVE OPEN |
| FEED WATER CONTROL SYSTEM FAILURE | FLOW MISMATCH |

FIG. 3

| NAME | REACTOR WATER LEVEL |
|---|---|
| VALUE | L8:1500mm~<br>L7:1300mm~1500mm<br>L6:---- |
| NORMAL VALUE | L4 |
| CHANGE RATE | RAPIDLY : 300mm/sec~<br>ORDINARY: 100mm/sec~300mm/sec<br>SLOWLY : 0mm/sec~100mm/sec |
| CALCULATION METHOD FOR TIME | (TIME)={(BOUNDARY VALUE)<br>-(PRESENT VALUE)}/(CHANGE RATE) |
| CALCULATION METHOD FOR VALUE | (VALUE)=(PRESENT VALUE)<br>+(CHANGE RATE)x(TIME) |

FIG. 4

| IF PART | COUNTERMEASURE |
|---|---|
| REACTOR WATER LEVEL=L8 | MOTOR DRIVEN REACTOR FEED PUMP TRIP |
| REACTOR WATER LEVEL=L2 | HIGH PRESSURE INJECTION SYSTEM |
| REACTOR WATER LEVEL=L1 | AUTO-DEPRESSURIZATION SYSTEM OF RELIEF VALVE AND LOW PRESSURE INJECTION SYSTEM |
| REACTOR PRESSURE HIGH | AUTO-DEPRESSURIZATION SYSTEM OF RELIEF VALVE |

FIG. 5

| NAME | HPCS |
|---|---|
| START UP OPERATION (EXPLANATION) | CONFIRM FOLLOWING ITEMS RESET ISOLATION SIGNAL STEAM LINE WARNING |
| OPERATION CONDITION (RESTRICTION) | HPCS SUCTION VALVE OPEN STAND-BY AT STANDBY GAS TREATMENT SYSTEM |

FIG. 6

| NO. | 1 |
|---|---|
| CAUSE | SEIZURE OF PRIMARY LOOP RECIRCULATION PUMP |
| COMMENT | RESULT OF ANALYSIS |
| KEY WORD | VOID INCREASE<br>SCRAM<br>JET PUMP FLOW DECREASE |
| DATA FOR DISPLAY | 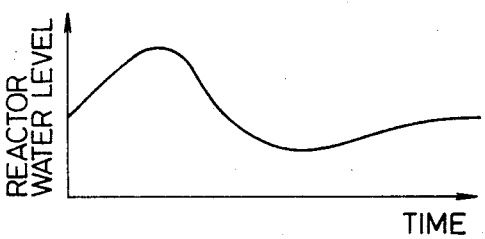 |

FIG. 20

| REACTOR WATER LEVEL = L7 JET PUMP FLOW DECREASE | ~46 |

FIG. 21

| REACTOR WATER LEVEL = L7 JET PUMP FLOW DECREASE | ~47 |

FIG. 22A

| VOID INCREASE | ~48A |

FIG. 22B

| FEED WATER FLOW INCREASE | ~48B |

FIG. 23A

| VOID INCREASE<br>    REACTOR WATER LEVEL RISE L7 | ~50A |

FIG. 23B

| FEED WATER FLOW INCREASE<br>    REACTOR WATER LEVEL RISE L7 | ~50B |

FIG. 25

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
NO-OPERATION
```
56

FIG. 27A

```
SEIZURE OF PRIMARY RECIRCULATION PUMP
         TURBINE TRIP
            SCRAM
            SWITCH ELECTRIC BUS
      JET PUMP FLOW DECREASE
MOTOR DRIVEN REACTOR FEED PUMP TRIP
VOID DECREASE
   REACTOR WATER LEVEL FALL L2
TURBINE BYPASS VALVE OPEN
   REACTOR PRESSURE FALL
```
60A

FIG. 27B

```
SEIZURE OF PRIMARY LOOP RECIRCULATION PUMP
         TURBINE TRIP
            SCRAM
            SWITCH ELECTRIC BUS
      JET PUMP FLOW DECREASE
NO-OPRATION
VOID DECREASE
   REACTOR WATER LEVEL FALL L4
TURBINE BYPASS VALVE OPEN
   REACTOR PRESSURE FALL
```
60B

FIG. 26A

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
MOTOR DRIVEN REACTOR FEED PUMP TRIP
```
—57A

```
SEIZURE OF PRIMARY LOOP RECIRCULATION PUMP
         TURBINE TRIP
            SCRAM
            SWITCH ELECTRIC BUS
            REACTOR PRESSURE HIGH
   JET PUMP FLOW DECREASE
MOTOR DRIVEN REACTOR FEED PUMP TRIP
VOID DECREASE
   REACTOR WATER LEVEL FALL L4
TURBINE BYPASS VALVE OPEN
```
—59B

FIG. 26B

```
SEIZURE OF PRIMARY LOOP RECIRCULATION PUMP
   VOID INCREASE
      REACTOR WATER LEVEL RISE L8
         TURBINE TRIP
            SCRAM
            SWITCH ELECTRIC BUS
            REACTOR PRESSURE RISE
   JET PUMP FLOW DECREASE
NO-OPERATION
```
~57B

```
SEIZURE OF PRIMARY LOOP RECIRCULATION PUMP
         TURBINE TRIP
            SCRAM
            SWITCH ELECTRIC BUS
            REACTOR PRESSURE HIGH
    JET PUMP FLOW DECREASE
NO-OPERATION
VOID DECREASE
   REACTOR WATER LEVEL FALL L6
TURBINE BYPASS VALVE OPEN
```
~59B

METHOD OF OPERATING POWER PLANTS

BACKGROUND OF THE INVENTION

This invention relates to a method of operating power plants, and particularly to that by which a pertinent guide for operation can be provided to cope with an abnormality of the plants.

A method to utilize Cause-Consequence Tree (hereinafter referred to as "CCT") has been proposed hitherto for providing a guide for operation at the time of a plant abnormality.

CCT is a process of putting the relation of cause and effect of a phenomenon taking place at a plant on the tree and is powerful to function when utilized for a guidance implementation of operation at the time of a plant abnormality. However, a huge quantity of CCT will have to be prepared to multiply the phenomenon with which the operation guide apparatus for a plant utilizing CCT is capable of coping, thus involving a difficulty for implementation and maintenance.

Then, a technique of knowledge engineering which is utilized for a medical consultation system will be taken up as the technique for implementation of a guidance system utilizing a small-scale data base effectively.

SUMMARY OF THE INVENTION

An object of this invention is to obtain a cause of an abnormality arising at a plant with precision.

Another object of this invention is to obtain an optimal and secure operation necessary to cope with an abnormality arising at a plant.

Further object of this invention is to minimize capacity of a data base.

A feature of this invention is to repeat a processing comprising a step to decide an existence of an actual plant state member in a forecasted plant state member and also to estimate a cause of bringing about the state member, when the latter member is not present in the former member, by inputting the forecasted plant state member until all the actual plant state members come to exist in the forecasted plant state member, and a step to forecast all the plant state members to arise after passing a given period of time according to the cause so estimated.

FIG. 2 is an explanatory drawing representing an example of the contents of a cause-consequence data base shown in FIG. 1;

FIG. 3 is an explanatory drawing representing an example of the contents of a transition forecast data base shown in FIG. 1;

FIG. 4 is an explanatory drawing representing an example of the contents of an operation data base shown in FIG. 1;

FIG. 5 is an explanatory drawing representing an example of the contents of a particularization data base shown in FIG. 1;

FIG. 6 is an explanatory drawing representing an example of the contents of a case data base shown in FIG. 1;

FIG. 20 is an explanatory drawing of a plant state signal outputted from the data conversion division;

FIG. 21 is an explanatory drawing of a plant state signal outputted from the state grasp division;

FIG. 22A and FIG. 22B are explanatory drawings of a plant state signal outputted from the state grasp division in the cause decision division;

FIG. 23A and FIG. 23B are explanatory drawings of a plant state signal outputted from the forecast division in the cause decision division;

FIG. 25 is an explanatory drawing of a plant state signal outputted from the state grasp division of the optimal operation determination division;

FIG. 26A and FIG. 26B, FIG. 27A and FIG. 27B are explanatory drawings of a plant state signal outputted from the forecast division and the state grasp division of the optimal operation determination division called recursively.

Figure 1:
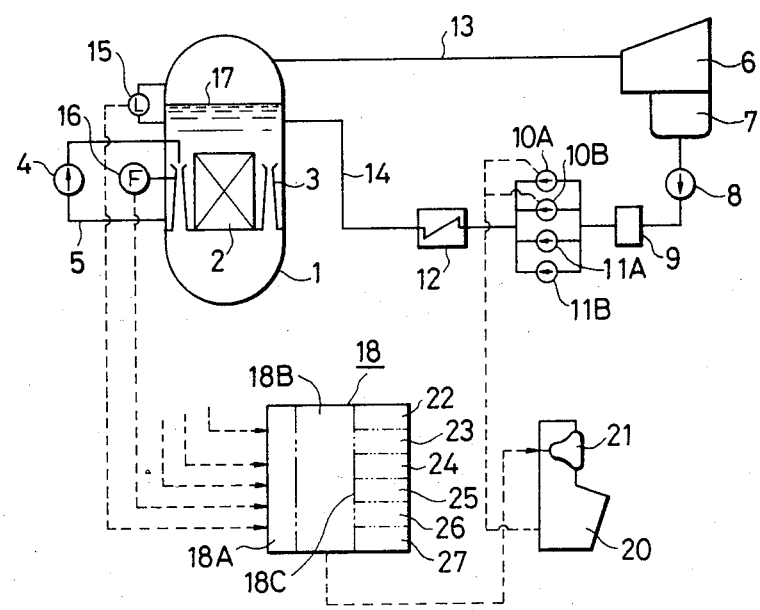
FIG. 1 is a system diagram of an apparatus for putting a plant operating method into practice which is given in one preferred embodiment of this invention to apply on a boiling water reactor plate.

A plant operating method which is given in one preferred embodiment of this invention to apply on a boiling water reactor plant will now be described with reference to FIG. 1.

Steam generated at a core 2 in a reactor pressure vessel 1 is sent to a turbine 6 by way of a main steam pipe 13 and then condensed in a condenser 7 to water. The water is supplied into the reactor pressure vessel 1 as a cooling water by way of a feed-water piping 14. The feed-water piping 14 connects a condensate pump 8, a desalter 9, feed-water pumps 10A, 10B, 11A and 11B and a feed-water heater 12 from the upsteam side in that order. The feed-water pumps 10A, 10B, 11A and 11B are of motor-driven type. The feed-water pumps 11A and 11B are driven temporarily for start-up and shutdown of a reactor but left in stanby for backup of the feed-water pumps 10A and 10B during a normal operation of the reactor. The feed-water pumps 10A and 10B are driven all the time during operation of the reactor. The cooling water coming into the reactor pressure vessel 1 is sent to the core 2 by way of a jet pump 3 by a recirculating pump 4 which is provided on a recirculating system piping 5.

A water gauge 15 detects a water level (reactor level) 17 in the reactor pressure vessel 1. A flow meter 16 detects a discharge flowing in the jet pump 3. The sum of all discharges flowing in the jet pump 3 will indicate a quantity of the cooling water flowing in the core 2. The process amount including the reactor level 17 and the jet pump discharge which are measured on various detectors is inputted to a central processor 18B of an electronic computer 18 by way of a process input/output unit 18A of the electronic computer 18. The electronic computer 18 has a memory (internal memory and external memory) 18C, besides. A consequence processed on the central processor 18B is displayed on a Braun tube (or CRT) 21 provided on a control panel 20.

The present embodiment comprises obtaining an operation guide for the above reactor plant abnormality through utilizing a technique of knowledge engineering, carrying out an operation at the time of abnormality occurrence according to the guidance, thereby coping with an abnormal state of the reactor plant. Such operating method will be described as follows. The memory 18C of the electronic computer 18 stores a cause-consequence data base 22, a transition forecast data base 23, an operation data base 24, a detail data base 25, a case data base 26 and a processing program 27.

The cause-consequence data base 22 is that in which the relation of cause and effect is recorded which comprises combining a cause and a consequence to be determined directly related to the cause. This is a data storing area which corresponds to that of the general "rule" as termed by people who research knowledge engineering. An example of the cause-consequence data base 22 in a boiling water reactor plant is shown in FIG. 2.

The transition forecast data base 23 is a data base for storing information to build up a data of the cause-consequence data base 22 in accordance with the lapse of time. Stored herein are information on the operating state of each equipment of the plant and the state of each process amount and a technique to obtain, for the process amount for which a value representing the state has been obtained, a time to change the value and a value after a certain time passes. An example of the transition forecast data base 23 in a boiling water reactor plant is shown in FIG. 3.

FIG. 4 represents an example of the operation data base 24 in a boiling water reactor plant. The operation data base 24 is a data base for adding a combination of a condition division and an operation plan with a combination of the state of each process amount and the operating state of each equipment of the plant as the condition division and an operation then conceivable as the operation plan.

The detail data base 25 is a data base for recording a detail operating method and operating limit of each equipment of the plant.

The case data base 26 is a data base for enclosing a consequence of prior analysis and a record at the time of past operation.

The detail data base 25 and the case data base 26 in a boiling water reactor plant are shown in FIG. 5 and FIG. 6, respectively.

Figure 7:
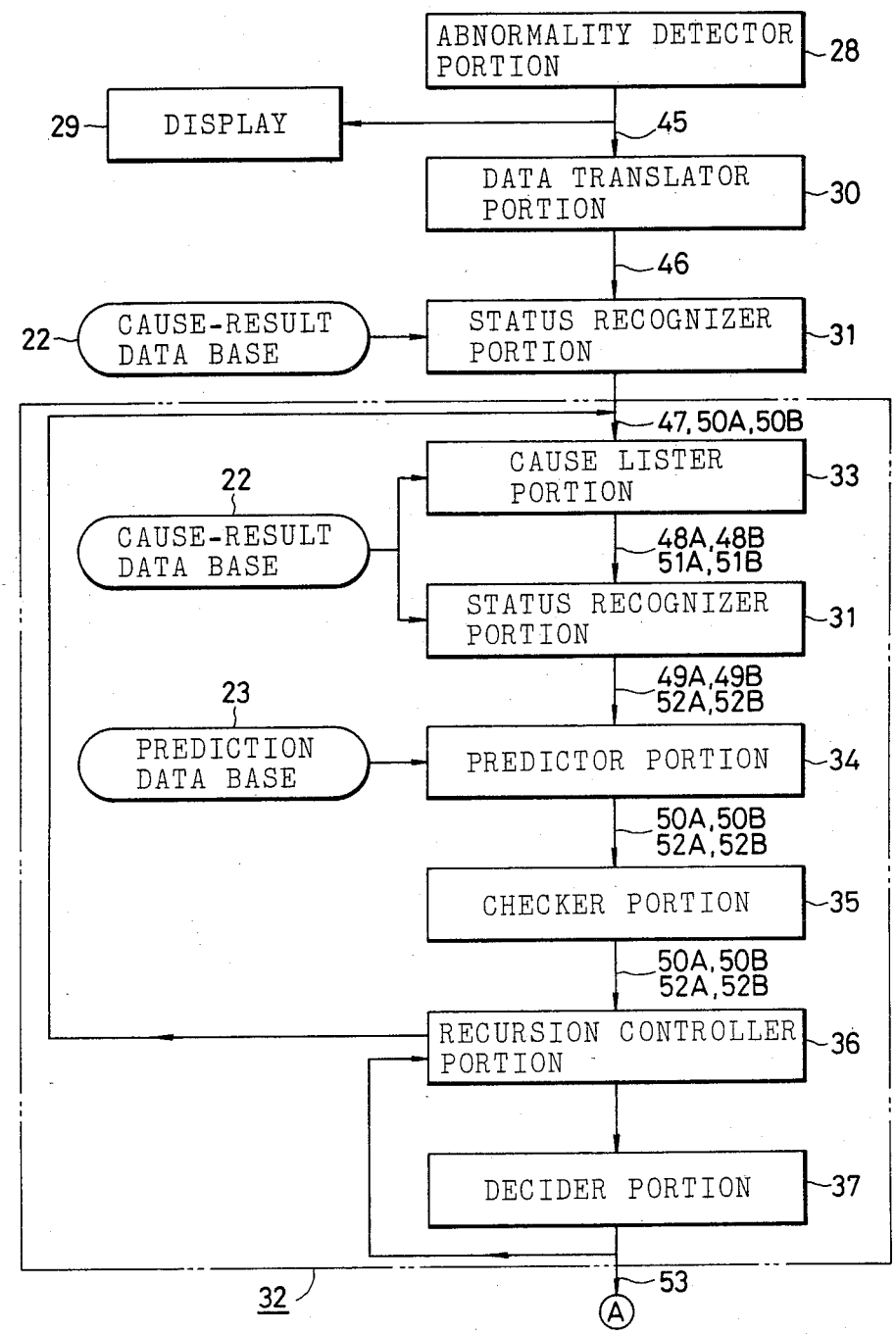
FIG. 7 and FIG. 8 are flowcharts of a processing program shown in FIG. 1.
Figure 8:
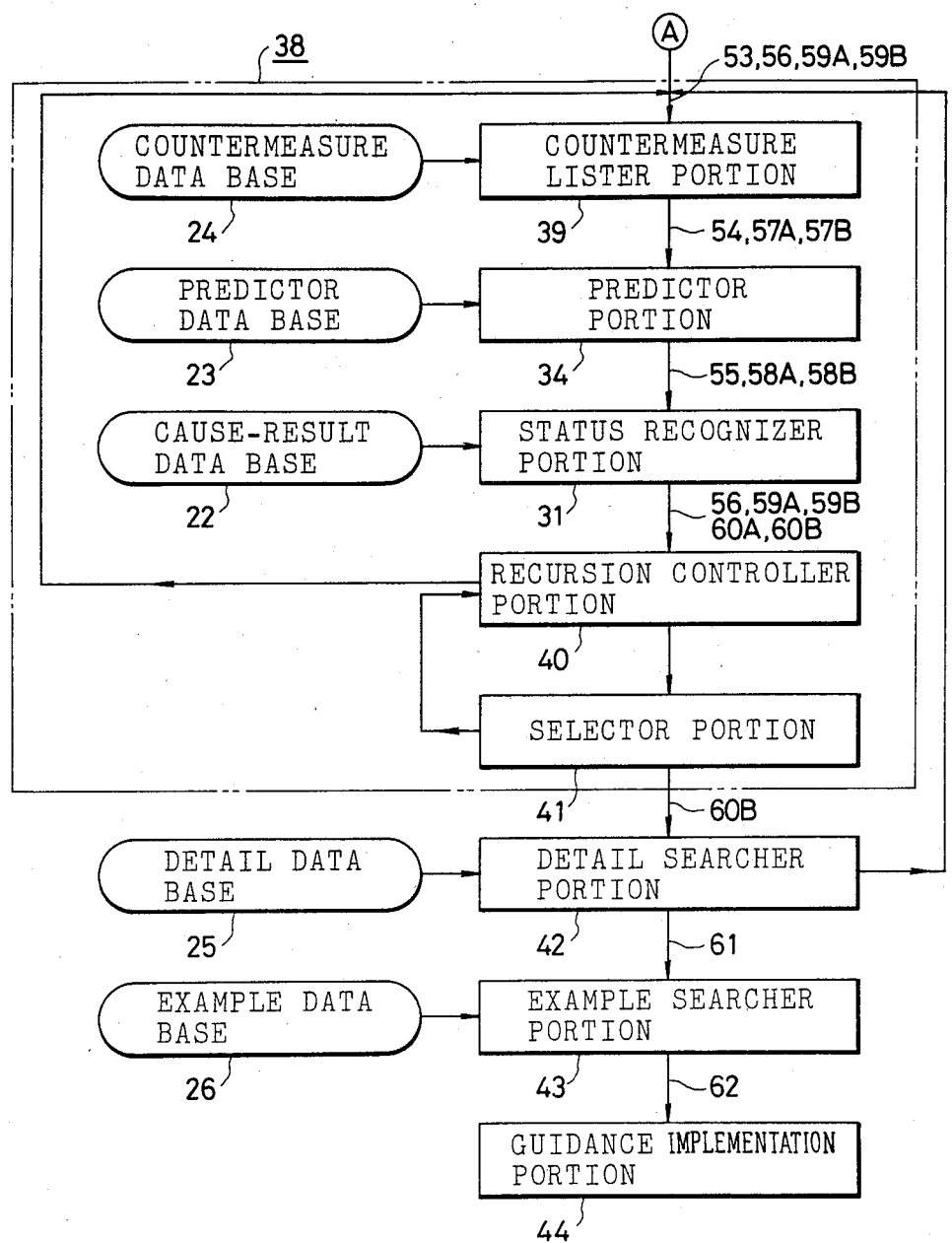

An example of the processing program 27 will be described with reference to FIG. 7 and FIG. 8. The processing program 27 consists of an abnormality detector portion 28, a data translator portion 30, a status recognizer portion 31, a cause decision division 32, an optimal operation determination division 38, a detail searcher portion 42, an example searcher portion 43 and a guidance implementation portion 44. The cause decision division 32 has a cause lister portion 33, a status recognizer protion 31, a predictor portion 34, a checker portion 35, a recursion controller portion 36 and a decider portion 37 of the cause decision division 32. Further, the optimal operation determination division 38 has countermeasure lister portion 39, a predictor portion 34, a status recognizer portion 31, a recursion controller portion 40 and a selector portion 41 of the optimal operation determination division 38.

Figure 9:
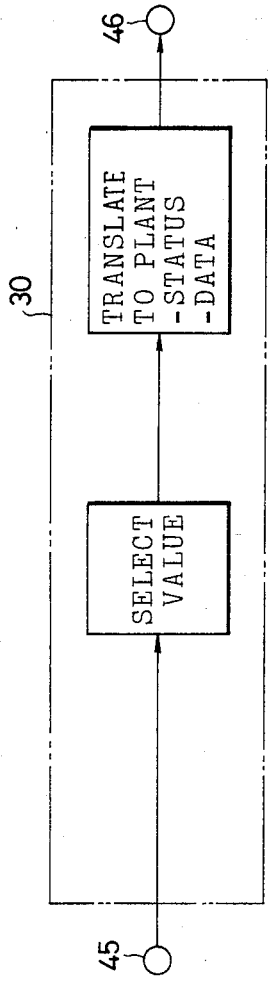
FIG. 9 is a block diagram of a data conversion division shown in FIG. 7.

The data translator portion 30 inputs a plant data which comes in a measured process amount, unifies values of each plant data through a logical decision like majority decision, obtains a member state or status (an item to indicate one state of the plant) through combining an identifier for the plant data and a consequence transformed into a special value in an apparatus to obtain a guidance for plant operation which indicates a value of the plant data in the processing given below (hereinafter referred to as "operation guide apparatus"), and then outputs these member states in a plant state signal. A flowchart of the data translation portion 30 is shown in FIG. 9.

Figure 10:
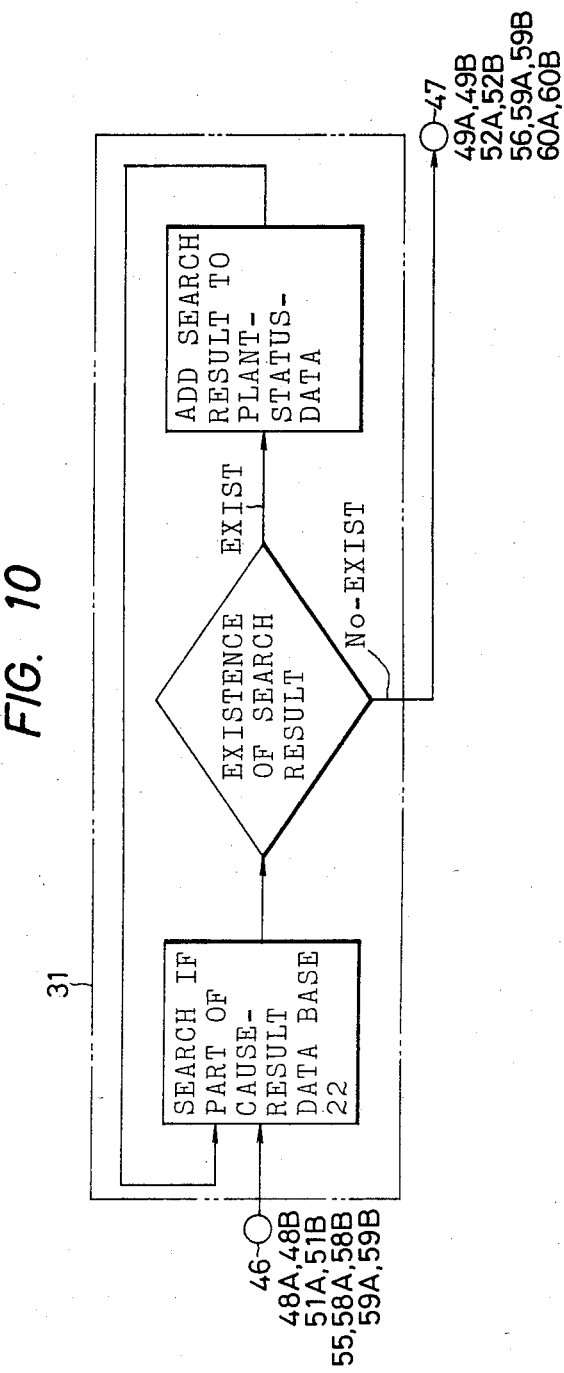
FIG. 10 is a block diagram of a state grasp division shown in FIG. 7.

The status recognizer portion 31 compares each "cause" enclosed in the cause-conseqence data base 22 with the inputted plant state signal and selects a "consequence" to come out according to the "cause" corresponding to the plant state signal. Then, the selected consequence is added to the inputted plant state signal as a new member state. A flowchart for the status recognizer portion 31 is shown in FIG. 10.

Figure 11:
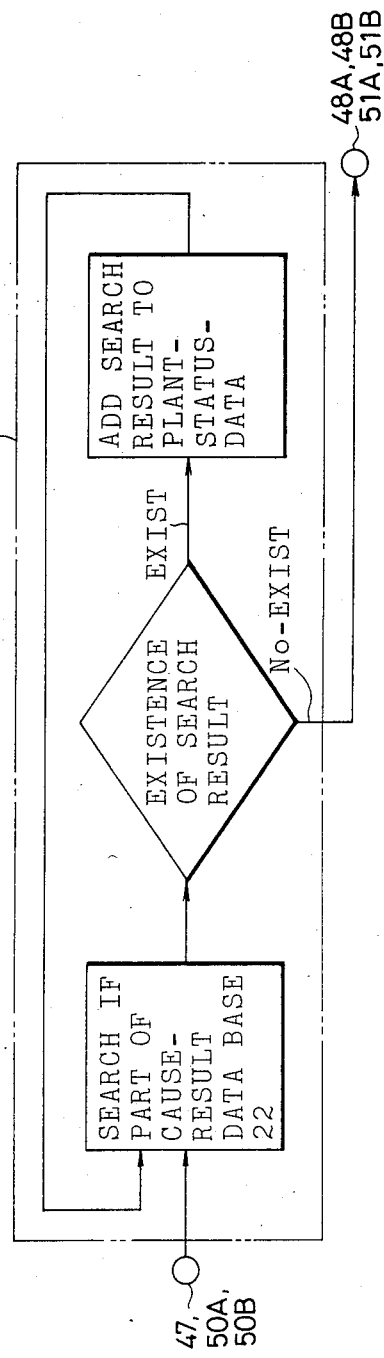
FIG. 11 is a block diagram of a cause enumeration division shown in FIG. 7.

The cause lister portion 33 obtains a member state capable of causing each member state of the inputted plant state signal or a combination thereof through retrieving the "consequence" enclosed in the cause-consequence data base 22, thus outputting a retrieved "consequence". The flowchart is shown in FIG. 11.

Figure 12:
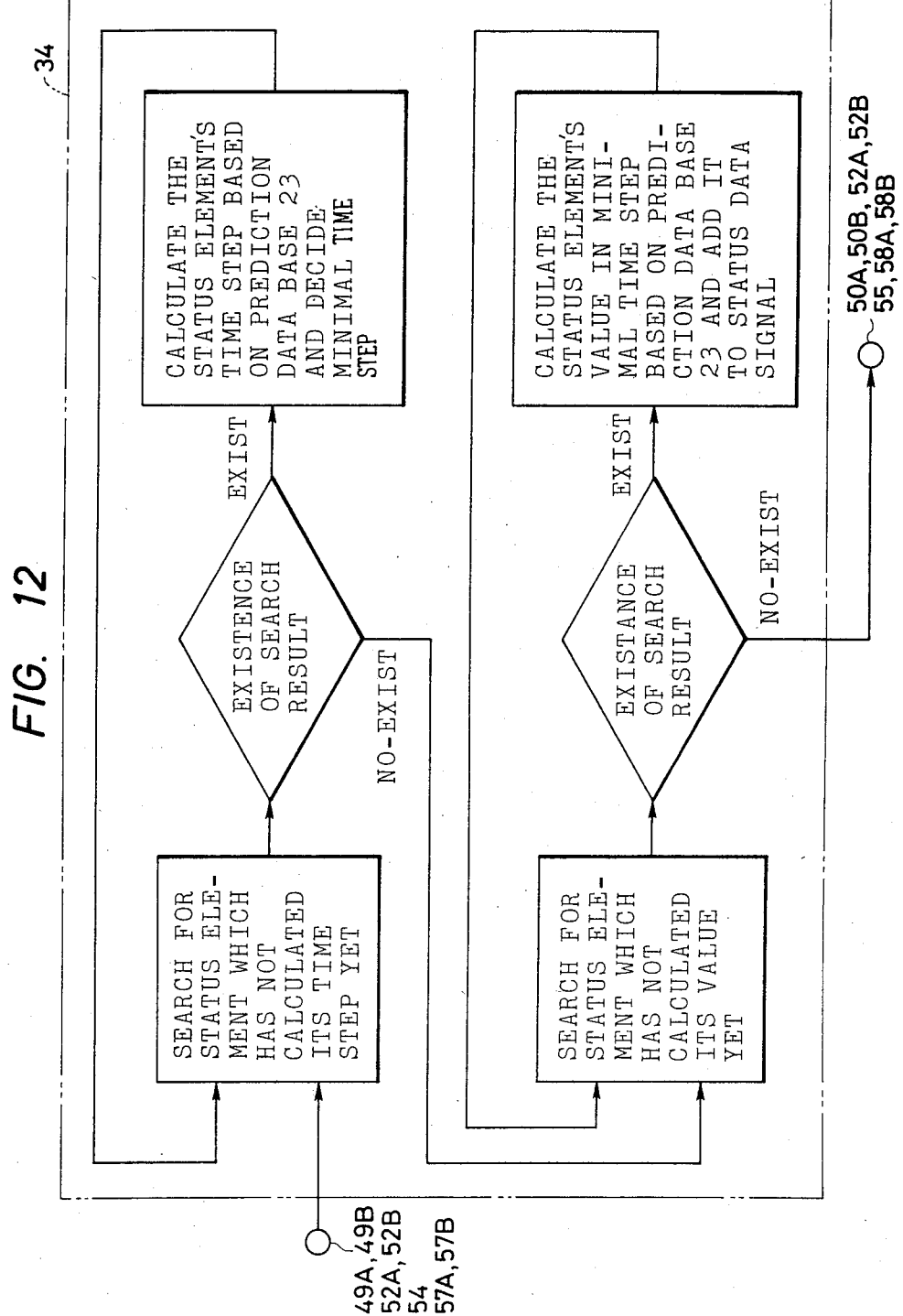
FIG. 12 is a block diagram of a forecast division shown in FIG. 7.

The predictor portion 34 inputs the plant state signal and obtains the time until values of each member state of the inputted plant state signal change to those of the next level through executing a calculating technique (program) stored in the prediction data base 23. Next, it selects the shortest time of those obtained as above and obtains the value of each member state after passing the shortest time also through executing the calculating technique stored in the prediction data base 23. Each member state is then unified and outputted as a plant state signal for the next step. A flowchart of the precitor portion 34 is shown in FIG. 12.

Figure 13:
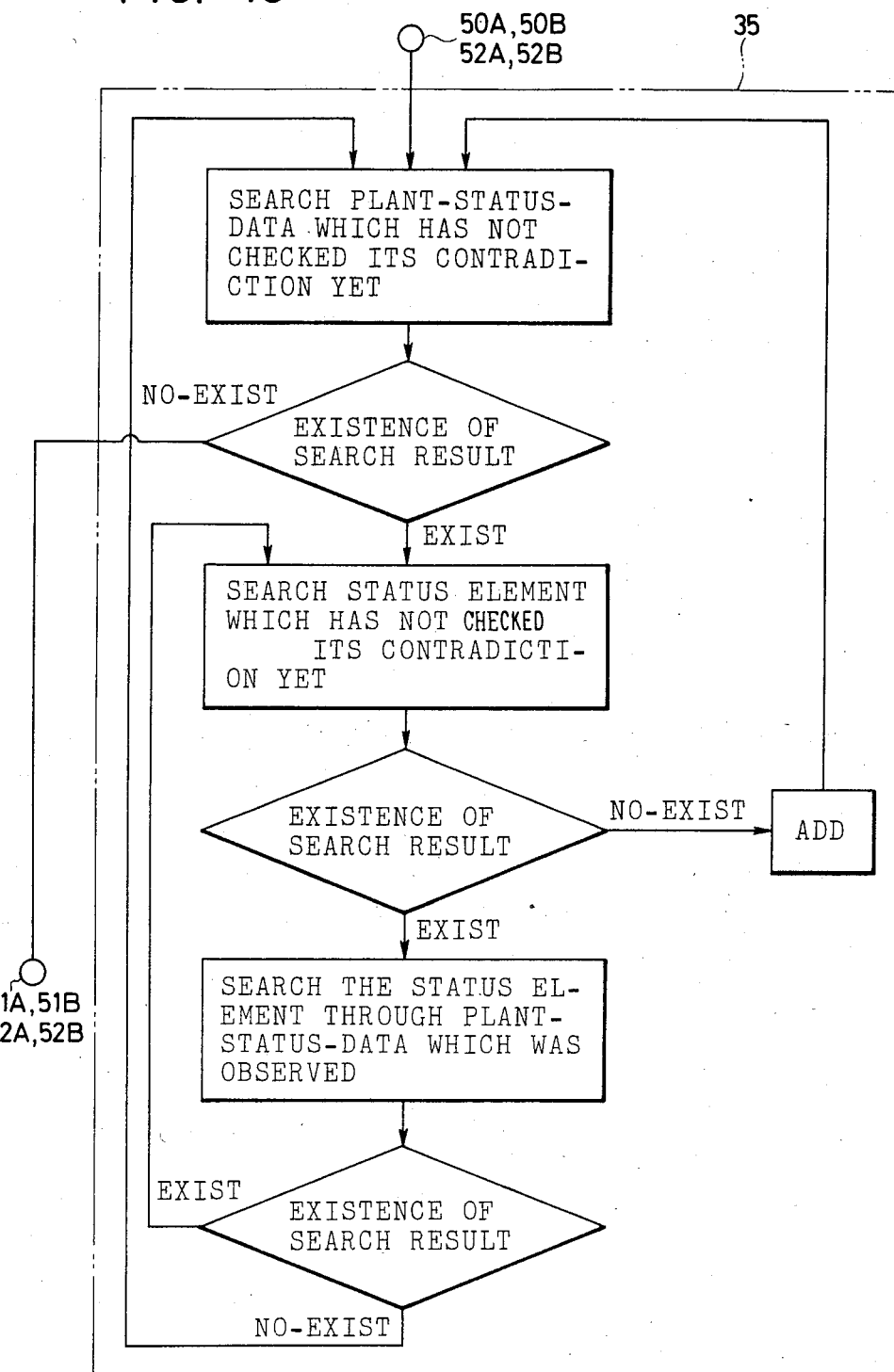
FIG. 13 is a block diagram of a non-contradiction confirmation division shown in FIG. 7.

The checker portion 35 inputs a reference plant state signal and a single or plural plant state signal for which non-contradiction is confirmed and outputs a plant state signal not included in the original plant state signal and not including a member state taken in by the data translator portion 30. FIG. 13 shows a flowchart of the non-contradiction confirmation division 35.

Figure 14:
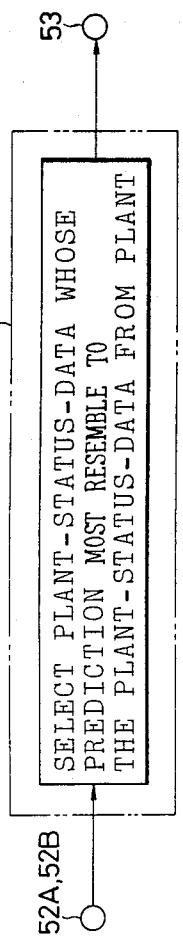
FIG. 14 is a block diagram of a decision division shown in FIG. 7.

The decider portion 37 inputs a plurality of plant state signals and outputs a plant state signal including each member state most approximate to each member state constituting the plant state signal inputted to the cause decision division 32. FIG. 14 shows the contents.

Figure 15:
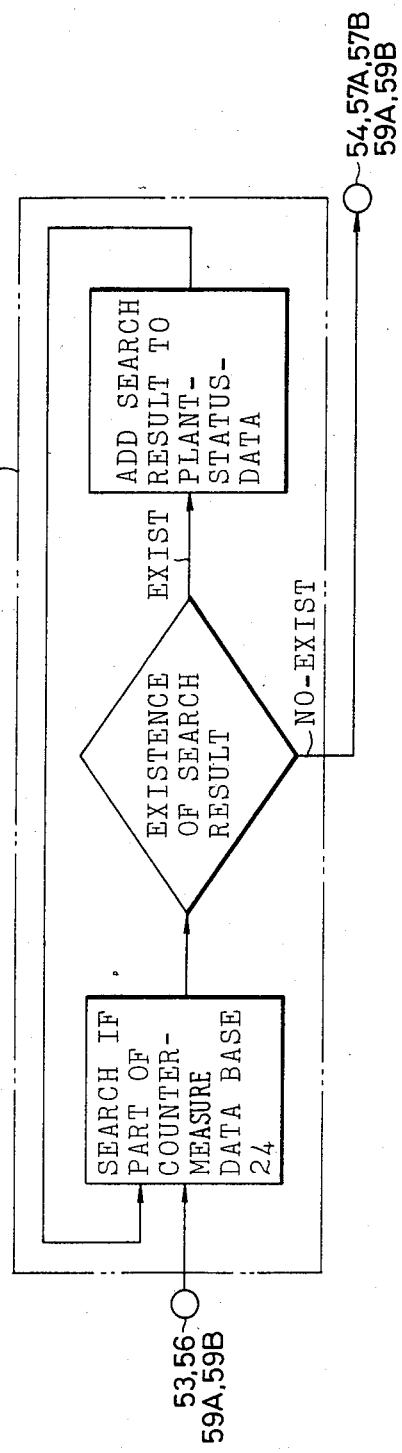
FIG. 15 is a block diagram of an operation enumeration division shown in FIG. 8.

The countermeasure lister portion 39 inputs a plant state signal and lists to output operation plans then conceivable by retrieving the condition division of the countermeasure data base 24. A flowchart of the countermeasure 39 is shown in FIG. 15.

Figure 16:
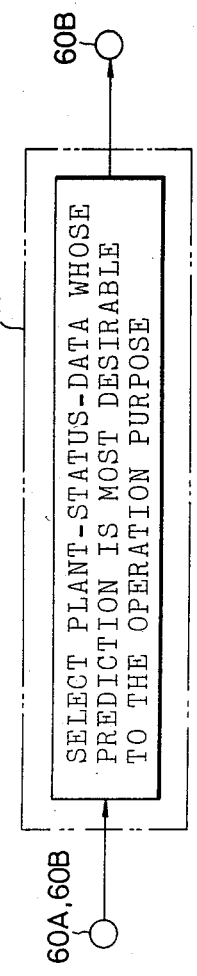
FIG. 16 is a block diagram of a determination division shown in FIG. 8.

The selector portion 41 inputs a plurality of plant state signals, as hsown in FIG. 16, and outputs the plant state signal most approximate to the operation object then prevailing.

The cause decision division 32 inputs a plant state signal at the time of a plant abnormality, actuates the cause lister portion 33, the status recognizer protion 31, the prediction portion 34, the checker portion 35, the recursion controller portion 36 and the decider portion 37 to decide a cause of the plant abnormality, and then outputs the plant state signal to which the cause is added. The plant state signal outputted from the cause decision division 32, actuates the countermeasure lister portion 39, the predicator portion 34, the status recognizer portion the recursion controller portion 40 and the selector portion 41 to determine an optimal operating method, and outputs the plant state signal to which a consequence obtained through executing the operation is added.

Figure 17:
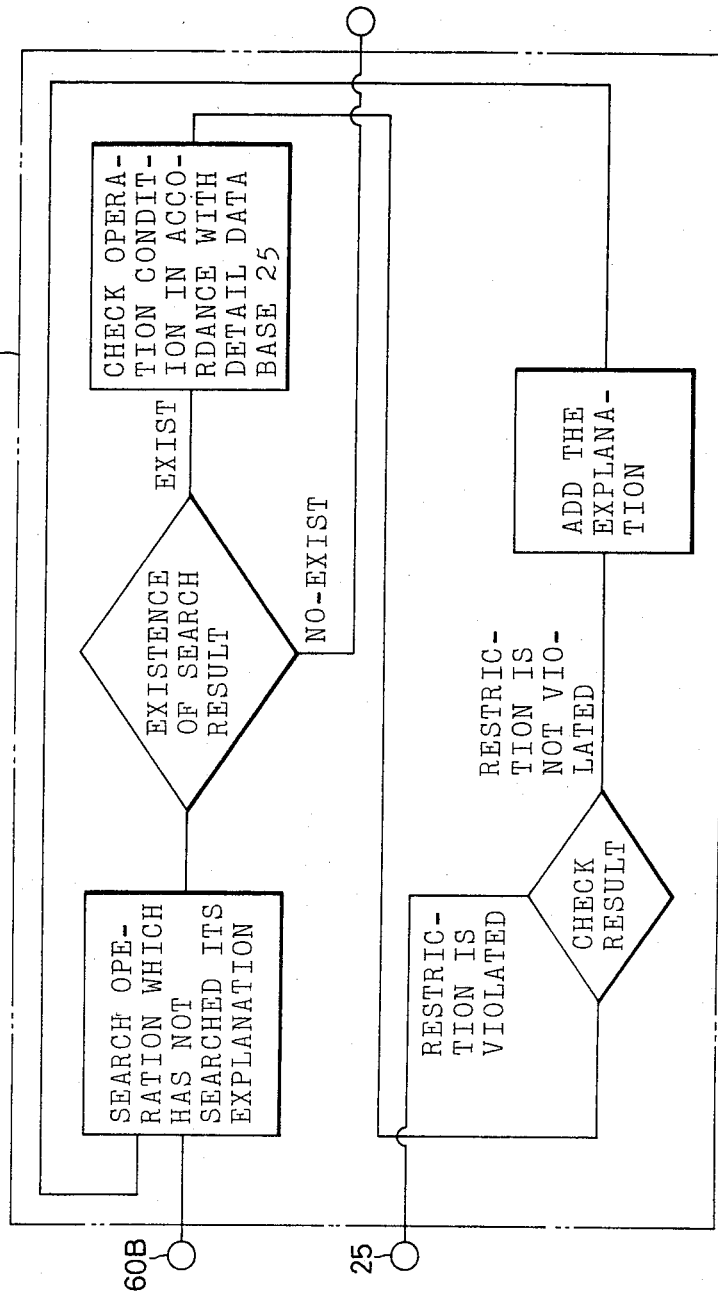
FIG. 17 is a block diagram of a particularization division shown in FIG. 8.

The detail searcher portion 42 inputs the plant state signal outputted from the optimal operation determination division 38 and retrieves what signifies an operation of the equipment of the plant according to each member state of the plant state signal. And after ensuring that the retrieved operation satisfies an operation limit of the detail data base 25, it adds a detail operation procedure to the plant state signal. Where the retrieved operation does not meet the operation limit of the detail data base 25, it reruns the optimal operational determination division 38. A flowchart of the detail searcher portion 42 is shown in FIG. 17.

The example searcher portion 43 inputs the plant state signal outputted from the detail searcher portion 42, retrieves a cause and a keyword of the case data base 26 and adds that in which the cause coincides or the keyword coincides with a member state of the plant state signal at a constant rate or over to the plant state signal as an analogous case.

The guidance implementation portion 44 inputs the plant state signal outputted for the example searcher portion 43 and changes the format to output it to CRT 21.

An operating method of a boiling water reactor plant on an apparatus having the above-mentioned features will be described as follows.

While such a phenomenon will not be conceivable actually, the phenomenon wherein a shaft of the recirculating pump 4 to feed a cooling water to the core 2 happens to adhere during operation of the boiling water reactor plant is premised for description. When the shaft is adherent as mentioned, the quantity of a cooling water flowing in the core 2 decreases and a void in the core 2 increases. The increase in void may lead to an ascent of the reactor level 17. Actually, a phenomenon of the shaft adherence and the void increase is not apparent but a process amount of the measured reactor level and the jet pump discharge is only known. The reactor level 17 normally comes at a level L4. When the reactor level 17 reaches a level L8, the reactor is shut down urgently (scram). When the reactor level 17 reaches a level L7 immediately before the scram, an indication is given to that effect on the control panel 20. An operator is thus acquainted with an ascent of the reactor level. A plant data representing a process amount of the reactor level 17 and the jet pump discharge is inputted to the central processor 18B by way of the input/output unit 18A. The inputted plant data is then subjected to an analog-digital conversion so as to serve well for a processing in the central processor 18B. Upon inputting the plant data, the central processor 18B calls the processing program 27 (FIG. 7 and FIG. 8) which is an operation guide apparatus in the memory 18C and performs a given processing according to the processing program 27. The abnormality detector portion 28 determines a plant data indicating an abnormal value of those which are inputted. When the plant data indicating an abnormal value (the reactor level 17 reaching L7 level in the case of this embodiment) is present, a command 29 is outputted and contents of the abnormality are displayed on the control panel 20. When there is present further such plant data indicating an abnormal value, the processing after the data translator portion 30 of the processing program 27 is executed.

One or plural plant data 45 measured at the boiling water reactor plant is inputted to the data translator portion (FIG. 9) 30. Such data as will not satisfy a set point (exceeding or coming lower) are all selected from the plant data 45 and then converted into a plate state signal 46. The data translator portion 30 outputs the plant state signal 46 shown in FIG. 20.

In the boiling water reactor plant, a plural detectors are provided for an important process amount like reactor level. Therefore, it must be ensured that the measured results are coincident with each other. If not, then an erroneous value measured on the detector which is so given through a majority decision is prevented from being inputted to the operation guide apparatus.

In FIG. 21, contents are given in ordinary characters, however, EBCDIC character code or integral number can be used practically.

The plant state signal 46 which is an output of the data translator portion 30 is inputted to the status recognizer portion (FIG. 10) 31, which portions supplements information, if any, which is missing with the plant state signal 46 shown in FIG. 20. Namely, the cause division of the cause-consequence data base 22 shown in FIG. 2 is retrieved according to each member state of the inputted plant state signal 46. Next, a decision is made on the retrieved result, and if "YES", the retrieved result is added to the plant state signal 46. After that, the cause division of the cause-consequence data base 22 is again retrieved. A decision is made on the retrieved result, and if "NO", then a plant state signal 47 to which the above-mentioned retrieved result is added is outputted. There is nothing to add in this embodiment, and the plant state signal 47 similar to that of FIG. 20 which is shown in FIG. 21 is outputted. In the embodiment, input and output of the status recognizer portion 31 are identical.

Since the time of occurrence of the abnormality is assumed for operation of the embodiment, a processing of the cause decision division 32 is executed by inputting the plant state signal 47.

The plant state signal 47 is inputted first to the cause lister portion 33 in the cause decision division 32. With each member state of the plant state signal 47 as a "consequence", the cause lister portion 33 retrieves the member state of the plant state signal 47 from a conseqence division of the cause-consequence data base 22 (FIG. 2) and adds an item of the cause division coping with the member state to the plant state signal 47. Namely, the member state of the plant state signal 47 indicates "reactor level=L7" and "jet pump discharge decreasing". Where the member state is present in two or more, the member state higher in importance is subjected to retrieval. An importance of the member state is specified beforehand. In this embodiment, "reactor level=L7" is more inportant and hence is subjected to retrieval. "Reactor level=L7" is so given as a consequence of the reactor level having ascended, therefore "reactor level ascending" is retrieved from the consequence division of the cause-consequence data base 22, and "void increase" and "feed water flow increase" which are items of the cause division corresponding thereto are added to the plant state signal 47. The consequence division of the cause-consequence data base 22 is again retrieved. However, nothing will be retrieved. Next, a decision is made on the retrived conseqence. Since nothing can be retrieved in this case, the cause lister portion 33 outputs plant state signals 48A and 48B to which "void increase" and "feed water low increase" are added as shown in FIG. 22A and FIG. 22B.

The status recognizer portion 31 retrieves items of "void increase" and "feed water flow increase" from the cause division of the cause-consequence data base 22 by inputting the plant state signals 48A and 48B and obtains "reactor water level rise" which is an item of the consequence division corresponding thereto. Then, plant state signals 49A and 49B with the above added thereto are outputted. The plant state signals 49A and 49B are inputted to the predictor portion 34 (FIG. 12).

A transition of the plant state when the void increases and the feed water flow increases from a combination of "cause" and "conseqence" enclosed in the cause-consequence data base 22 can be forecasted by using the predictor portion 34. The predictor portion 34 retrieves a member state in the plant state signals 49A and 49B for which a change time is not calculated and calculates the time in which each retrieved member state changes until there is no member state to be retrieved. The time in which the retrieved member state changes refers to a time required for the member state to change from the current level to the next level (the next level being L7 to the current level L6 in the reactor level). Next, whether or not the change time thus obtained is minimum will be decided. A change time for "reactor water level increase" to each of "void increase" and "feed water flow increase" of the plant state signals 49A and 49B is obtained according to the calculating method (time calculating method) shown in the predictor data base 23 of FIG. 3. Then, each member state after the minimum change time thus obtained passes is calculated according to a technique (state calculating method) of the predictor data base 23. The predictor portion 34 outputs plant state signals 50A, 50B with a new plant state signal added which is shown in FIG. 23A and FIG. 23B. A change of the phenomenon arising according to "cause" specified by the cause lister portion 33 (or "conseqence" retrieved by the status recognizer portion 31 of the cause decision division 32), which will be brought as time passes can be obtained by the predictor portion 34. A decision on whether or not the "cause" estimated by the cause lister 33 is a true cause will thus be facilitated, even if an abnormality occurs with a dynamic process amount of the boiling water reactor plant. In other words, the true cause which brings a plant data indicating the abnormality measured actually at the boiling water reactor can be obtained easily thereby.

The checker portion 35 shown in FIG. 13 which has inputted the plant state signals 50A and 50B ensures that the plant state signal produced in consequence does not include a member state which is not present in the plant state actually produced and for which the cause is not estimated by the cause lister portion 33 itself. The confirmed plant state signal is outputted as it is, however, that of having produced a member state which is not present in the actual plant state but taken in by the data translator portion 30 as a consequnce is regarded improper as a cause and hence is not outputted. In this embodiment, the state signals 50A and 50B of FIG. 23A and FIG. 23B are not contradictory and outputted as they are from the non-contradiction checker portion 35.

Figure 24A:
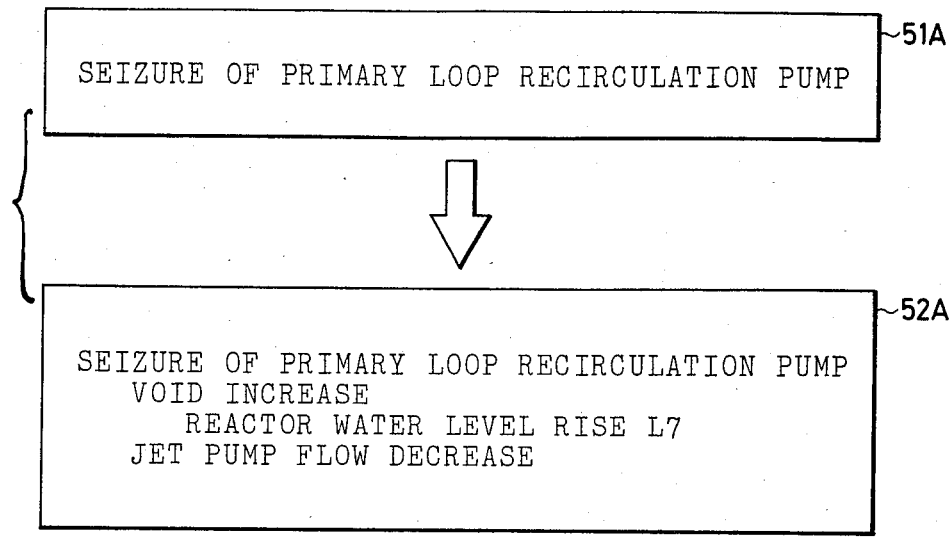
FIG. 24A and FIG. 24B are explanatory drawings of a plant state signal outputted from the cause enumeration division and the state grasp division of the cause decision division called recursively.
Figure 24B:
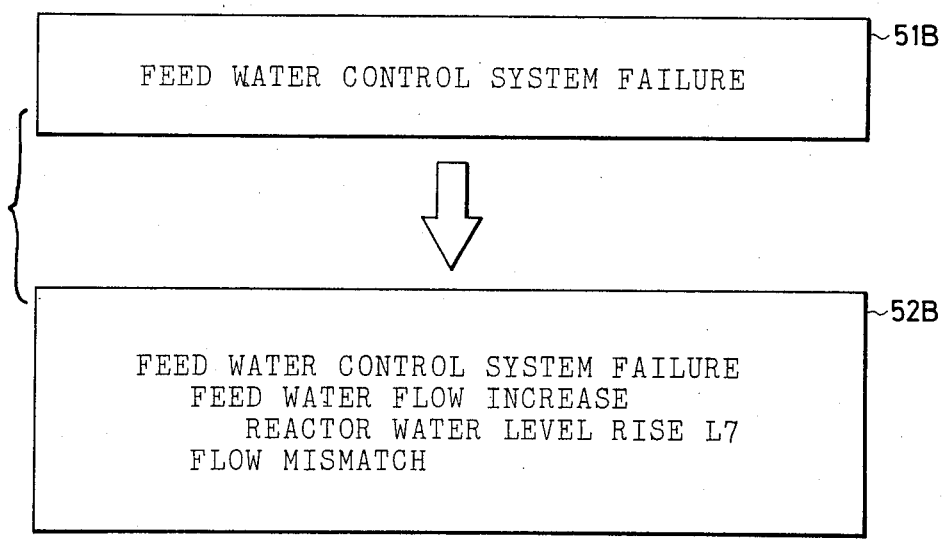

The plant state signals 50A, 50B outputted from the checker portion 35 are inputted to the recursion controller portion 36. The recursion controller portion 36 compares the plant state signals 50A and 50B which are outputs of the checker portion 35 with the plant state signal 47 outputted to the cause decision division 32. Where either one member state of the plant state signals 50A and 50B coincides with the plant state signal 47, the recursion controller portion 36 will not function. In this case, the plant state signals 50A and 50B are transferred to the decider portion 37. In this embodiment, a member state "jet pump flow decrease" is included in the plant state signal 47 but not included in both the plant state signals 50A and 50B. The recursion controller portion 36 therefore calls recursively the cause decision division 32 for which the plant state signals 50A and 50B work as inputs. Namely, the processing from the cause lister portion 33 to the checker portion 35 is rerun. The plant state signals 50A and 50B are inputted to the cause lister portion 33. The cause lister portion 33 retrieves the consequence division of the cause-consequence data base 22 with the member states "void increase" and "feed water flow increase" of the plant state signals 50A and 50B as "consequence", thereby obtaining "cause" corresponding thereto. Seizure of primary loop recirculation pump" indicated by 51A in FIG. 24A is retrieved for the former; "feed water control system failure" indicated by 51B in FIG. 24B is retrieved for the latter. Plant state signals 51A and 51B with these member states added to the plant state signals 50A and 50B are outputted from the cause lister portion 33. The The status recognizer portion 31 retrieves all "consequences" coming from the "cause" of member states of the plant state signals 51A and 51B from the cause-consequence data base 22. "Jet pump flow decrease" is retrieved for "seizure of primary loop recirculation pump" of the plant state signal 51A in addition to "void increase", and "flow mismatch" is retrieved for "feed water control system failure" of the plant state signal 51B in addition to "feed water flow increase". Each plant state signal 52A and 52B (FIG. 24A and FIG. 24B) to which these member states are added are outputted from the status recognizer portion 31 and inputted to the predictor portion 34. No change will be brought on the plant state signal from forecasting the transition of the plant state signals 52A and 52B as mentioned by the predictor portion 34, and hence they are inputting straight to the checker portion 35. The are also decided as not contradictory here and outputted straight accordingly.

The plant state signals 52A and 52B outputted from the checker portion 35 are inputted to the recursion controller portion 36. As described hereinabove, the recursion controller portion 36 compares the plant state signal 47 with the plant state signals 52A and 52B. The two member states reactor level L7" and "jet pump flow decrease" of the plant state signal 47 are also present in the plant state signal 52A. The recursion controller portion 36 therefore does not carry out a recursive call of the cause deqision division 32 and outputs the plant state signals 52A and 52B to the decider portion 37.

The decider portion 37 compares the plant state signals 52A and 52B shown in FIG. 24A and FIG. 24B respectively with the plant state signal 47 of FIG. 21 which indicates an actual plant state of the boiling water reactor plant.

Where "seizure of primary loop recirculation pump" is the cause, the plant state signal 52A coincides with the plant state signal 47. However, where "feed water control system failure" is the cause, the plant state signal 52B does not coincide with the plant state signal 47. Therefore, "seizure of primary loop recirculation pump" is decided as the cause, and the plant state signal 52A shown in FIG. 24A is outputted as a plant state signal 53 which is an output of the cause decision division 32. The processing on the cause decision division 32 is thus closed.

Since there exists the recursion controller portion 36, it can easily be decided whether or not the plant state resulting from the "cause" estimated according to this embodiment will be identified with a plant state indicating abnormity occurring at the boiling water reactor plant. Therefore, a true "cause" for the plant state indicating abnormality can be obtained simply and precisely.

A feature to decide whether or not a recursive call will have to be carried out through comparing a member state of the first plant state signal inputted to the cause decision division 32 with a member state of the second plant state signal outputted from the checker portion 35 can be placed on the front stage of the recursion controller portion 36 separately from the recursion controller portion 36. In case the member state of the second plant state signal coincides with a part of the member state of the first plant state signal and a new cause is not retrieved at the cause lister portion 22 after recursive call, it is taken that an abnormal phenomenon due to a different cause has occurred in two or more (multiple phenomenon). In such case, a cause to produce the member state of the first plant state signal after the member state of the second plant state signal is eliminated from that of the first plant state signal is obtained at the cause decision division 32 similarly as mentioned hereinabove.

The plant state signal 53 (the plant state signal 52A essentially this time) which is an output of the decider portion 37 of the cause decision division 32 is inputted to the countermeasure lister portion 39 of the optimal operation determination division 38. The countermeasure lister portion 39 retrieves the condition division of the countermeasure data base 24 for each member state of the plant state signal 52A and obtains an operation plane corresponding to the item of the condition division. In this embodiment, the corresponding item is not present in the condition divison of the countermeasure data base 24, as "reactor level L7". Therefore, there is no concrete operation plan in this case, and a plant state signal 54 with the operation plan "nothing operated" added to the plant state signal 53 is outputted from the countermeasure lister portion 39.

Next, the predictor portion 34 will function from inputting the plant state signal 54. The predictor portion 34 outputs a plant state signal 55 to which the change time of each member state of the plant state signal 54 and each member state after the minimum change time passes are added. Concretely, a state changing at the minimum change time is the reactor level, and a member state after passing the minimum time is the "reactor water level rise, L8". The plant state signal 55 to which the member state is added is outputted from the predictor portion 34.

The plant state signal 55 is inputted to the status recognition portion 31. The status recognition portion 31 retrieves a consequence "turbine trip" to the member state "reactor level rise, L8" which is added newly according to the cause-consequence data base 22. The state grasp division 31 further retrieves consequences "scram: switch electric bus and "reactor pressure rise" to the cause of retrieved member state "turbine trip". A plant state signal 56 (FIG. 25) to which these new member states are added is the output of the status recognition portion 31.

The plant state signal 56 is inputted to the recursion controller portion 40. The portion 40 has a means to compare the plant state signal inputted to the countermeasure lister portion 39 with the plant state signal outputted thereform, thereby deciding whether or not a new operation plan is added to the latter signal. Upon deciding that a new operation plan has been added, the recursion controller portion calls the optimal operation determination division 38 recursively, however, if the decision comes contrary thereto, then the recursive call will not be carried out. The operation plan "no operation carried out" is given in this embodiment, therefore a recursive call is made to the optimal operation determination division 38, and a processing is again effected on the countermeasure lister portion 39, the predictor portion 34 and the status recognition portion 31, each. The plant state signal 56 which is an output of the status recognition portion 31 is inputted to the countermeasure lister portion 39.

The countermeasure lister portion 39 inputs the plant state signal 56 and retrieves an operation plan to cope with the member state of this signal from the countermeasure data base 24. In this embodiment, an operation "motor driven feed water pump trip" corresponding to "reactor level rise, L8" is retrieved, and further "no operation carried out" is enumerated as an operation plan. Plant state signals to which these operation plans are added, i.e. plant state signals 57A and 57B shown in FIG. 26A and FIG. 26B respectively are inputted to the predictor portion 34. A transition of the plant state when each operation is carried out is forecasted by the predictor portion 34 as mentioned above. Namely, consequences of "reactor pressure rise, high" and "reactor level suddenly decreasing, L4" will be forecasted after the minimum change time passes further from the minimum change time obtained through the previous processing of the predictor portion 34 by executing "motor driven feed water pump trip" of the plant state signal 57A. "Reactor pressure rise, high" and "reactor water level fall, L6" will also be forecasted in the case of "no operation carried out". Plant state signals 58A and 58B to which these member states are added are inputted to the status recognition portion 31 from the predictor portion 34.

The status recognition portion 31 retrieves a "consequence" corresponding to each member state from the cause-consequence data base 22. Namely, for the plant state signal 58A having an operation plan "motor driven feed water pump trip", a consequence "bypass valve open" to the cause "reactor pressure high", a consequence "reactor water level low" to the cause "motor driven feed water pump trip", a consequence "void decrease" to the cause "scram (after a given time passes)" (since the minimum change time passed two times after scram), and a consequence "reactor level fall" to the cause "void decrease" are retrieved. A plant state signal 59A of FIG. 26A to which these retrieved consequences are added is obtained through processing of the status recognition portion 31. Then, for the plant state signal 58B having an operation plan "no operation carried out", the consequence "bypass valve open" to the cause "reactor pressure high", the consequence "void decrease" to the cause "scram (after a given time passed)", and the consequence "reactor level fall" to the cause "void decrease" are retrieved. A plant state signal 59B of FIG. 26B to which these retrieved consequences are added is obtained through processing of the status recognition portion 31.

The plant state signals 59A and 59B are inputted to the recursion controller portion 40. The portion 40 determines whether or not the optimal operation determination division 38 will have to be called recursively again according to whether or not the above-mentioned new operation plan has been added in the processing of the countermeasure lister portion 39 after recursive call. Since "motor driven feed water pump trip" is added as a new operation plan this time, a recursive call of the optimal operation determination division 38 is rerun. The plant state signals 59A and 59B are inputted to the countermeasure lister portion 39. However, the portion 39 does not add an operation plan newly to those of plant state signals 59A and 59B. Next, the predictor portion 34 inputs the plant state signals 59A and 59B outputted from the countermeasure lister portion 39 to forecast a state of each member state of the plant state signals after the minimum change time passes. Namely, for the plant state signal 59A having an operation plan "motor driven feed water pump trip", the reactor level is changed to "L2" and the reactor pressure is changed to "descending". Then, for the plant state signal 59B having an operation plan "no operation carried out", the reactor level is changed to "L4" and the reactor pressure is changed to "descending". The predictor portion 34 outputs plant state signals 60A and 60B shown in FIG. 27A and FIG. 27B for each operation plan.

The plant state signals 60A and 60B are inputted to the recursion controller portion 40. Since nothing is added newly at the countermeasure lister portion 39, a recursive call is not carried out this time. Therefore, the plant state signals 60A and 60B are inputted to the selected portion 41. The selector portion 41 selects either one of the plant state signals 60A and 60B as an optimal operation. Namely, "reactor level L2" will result from carrying out "motor driven feed water pump trip" of the plant state signal 60A, and "reactor level L4" will result from carrying out "no operation carried out". "No operation carried out" will be most pertinent to "seizure of primary loop recirculation pump" this time, thereby complying with the operation condition of the boiling water reactor plant, "not to drop reactor level". Therefore, the plant state signal 60B of FIG. 27B is outputted from the optimal operation determination division.

The predictor portion 34 is provided at the optimal operation determination division 38 in this embodiment, therefore when an operation (retrieved by the countermeasure lister portion 39) to dissolve the true cause of an abnormal state obtained at the cause decision division 32 is carried out, the future plant state which will be so obtained through carrying out the operation can be forecasted. In other words, the value of a dynamic process amount in the future can be forecasted. Moreover, the recursion controller portion 40 is also provided at the optimal operation determination division 38, therefore an optimal operation can easily be determined in consideration of the future plant state obtained at the predictor portion 34. According to this embodiment, an abnormal state occurring currently at the boiling water reactor plant can be dissolved easily, and an optimal operation high in safety can be selected, too. Further in the embodiment available by combining the cause decision division 32 having the predictor portion 34 and the recursion controller portion 36 with the optimal operation determination division 38 having the predictor portion 34 and the recursion controller portion 40, since the true cause of an abnormal state can be precisely recognized, the operation obtained for dissolving the abnormal state might be the best possible one. Furthermore, a correct cause can be found thereby, therefore whether or not the plant must be repaired immediately can be decided efficiently, a spot to repair can be detected beforehand for necessary repair, if any, and the repair after shutdown of the plant can be effected within a short period of time.

The plant state signal 60B outputted from the selector portion 41 of the optimal operation determination division 38 is inputted to the detail searcher portion 42. In this embodiment, the optimal operation being "no operation carried out", the detail searcher portion 42 does not function. The detail searcher portion 42 outputs the plant state signal 60B as an output (a plant state signal 61) of the detail searcher portion 42. For example, in case "motor driven feed water pump trip" of the plant state signal 60A is carried out and thus a high pressure injection system is operated by "reactor level L2" of the plant state signal 60A, a detail operating method (FIG. 5) of the high pressure injection system is picked out of the detail data base 25, and a plant state signal to which the above is added is outputted from the detail searcher portion 42. And where there is observed an offense from carrying out a close confirmation on the operation limit, a plant state signal to which "high pressure injection system cannot be used" is added is outputted, the output is then transferred to the optimal operation determination division 38 to rerun the above-mentioned processing of the optimal operation determination division 38, and a planning of the operation is again requested.

Figure 18:
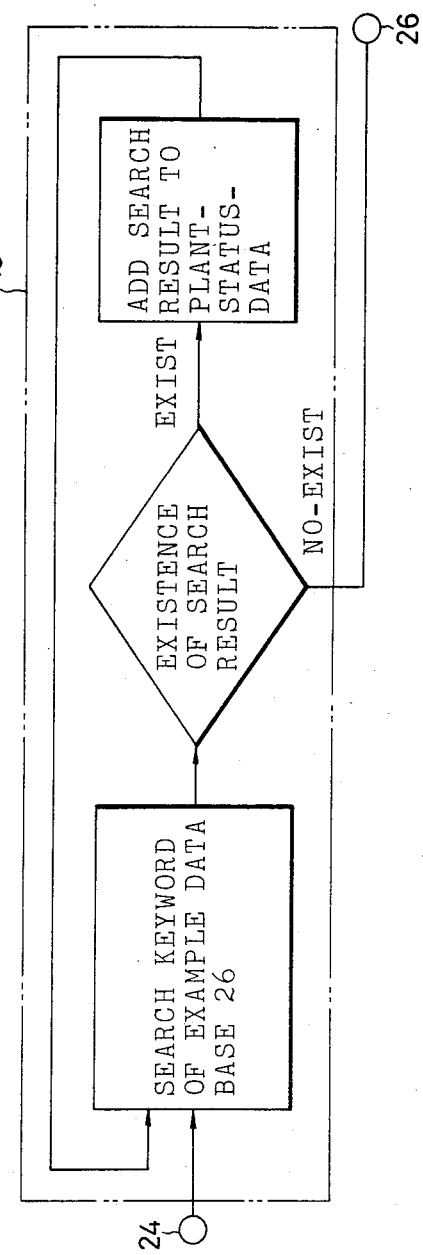
FIG. 18 is a block diagram of an analogous case retrieval division shown in FIG. 8.

The example searcher portion 43 shown in FIG. 18 is actuated from inputting the plant state signal 61. The example searcher portion 43 retrieves a case analogous to the plant state signal 61 from the example data base 26 which encloses practical cases as shown in FIG. 6. In this embodiment, Case 1 representing "seizure of primary loop recirculation pump" shown in FIG. 6 is retrieved, and the contents are added to the plant state signal 61 to develop to a plant state signal 62, which is outputted from the example searcher portion 43.

Figure 19:
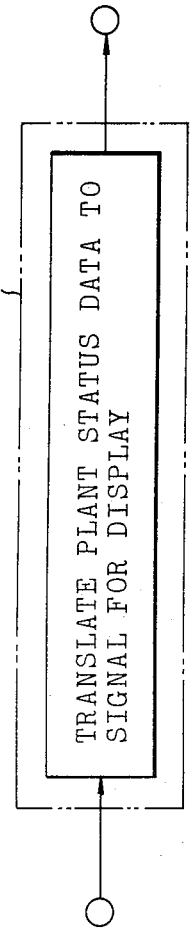
FIG. 19 is a block diagram of a guidance implementation division in FIG. 8.

The plant state signal 62 is inputted to the guidance implementation portion 44 shown in FIG. 19. The guidance implementation portion 44 outputs the plant state signal 60B shown in FIG. 27B through converting it into a CRT display output (into a character code for CRT, for example). In this case, the detail operating method and the contents of the analogous case are converted likewise. When converting the plant state signal 60B into the CRT display output, the guidance implementation portion 44 outputs that for CRT display which indicates the member state representing a cause and also the member state representing contents of the operation to cope therewith. For example, words (cause) and (operation contents) are added after the corresponding member states as: "seizure of primary loop recirculation pump (cause)" and "no operation carried out (operation contents)".

An output (plant state signal 60B) of the guidance implementation portion 44 is transferred to CRT 21 to display thereon. Observing the operation contents displayed on CRT 21, an operator of the boiling water reactor plant will operate an object equipment of the boiling water reactor plant on a control panel accordingly. The operation contents of this embodiment being "no operation carried out", a concrete operation will not be made for the boiling water reactor plant. To say reversely, an operation "no operation carried out" is performed for the boiling water reactor plant. From carrying out such operation, a void decreases, the reactor level 17 descends to the level L4, the bypass valve opens automatically, and thus the reactor pressure drops to a safe state in the boiling water reactor plant. In case, for example, contents of the plant state signal 60A are determined to be an optimal operation at the selector portion 41, the operator will operate the control panel 20 so as to trip a motor driven feed water pump according to the operation contents displayed on CRT 21. The command is given to feed water pumps 10A and 10B in operation from the control panel 20. Thus the feed water pumps 10A and 10B come to shutdown.

According to this embodiment, phenomena arising on the plant are all displayed on CRT when an actual operation is carried out based on the displayed operation contents, therefore a progress of the operation can be supervised by confirming the change of an actual state of the plant. Further, when "cause decision" and "operation determination" are made by utilizing the cause-consequence data base 22, a use of the predictor portion 34 may ensure a safe operation of the boiling water reactor plant (safety being ensured even from the motor driven feed water pump in trip) against an abnormal phenomenon which is not conceivable actually like "seizure of primary loop recirculation pump", thus obtaining an optimal operation high in safety.

When a guidance for such operating method as is high in safety against an abnormal phenomenon actually not conceivable for occurrence will have to be secured on an operation guide apparatus merely utilizing CCT and a technique of knowledge engineering (not including the predictor portion and the recursion controller portion unlike this embodiment), a large-scale data base must be provided, and labor will be required much for rules for the guidance implementation and maintenance. A materialization by the technique may involve difficulty, accordingly. Namely, a method to utilize CCT requires a vast amount of CCT to difficulty of implementation and maintenance. And in case the technique of knowledge engineering is utilized, the data runs vast inevitably in volume from the requirements that a data representing cause and consequence must be prepared to cover the case wherein the measured result to indicate the state of a plant is present plurally and that a data limited for the range of application must be prepared in consideration of forecasting a transition (or forecasting a change in dynamic process amount) of the plate beforehand since it cannot be forecasted.

According to a technique of this embodiment, operators are kept from troubles to improve the guidance operation, carry out such erroneous operation as will reduce an effect of the guidance operation, or take much time to cope with a load fluctuation when the plant is activated.

Then, a guidance coping at all times with a renewed situation can be provided to operators by rerunning the above processing through a generation of a new alarm, another request by the operator, or an interruption of an internal clock of the operation guide apparatus.

When the embodiment is put into practice, the plant data can be inputted at every member states at the point in time when the status recognition portion 31 is actuated, and the cause division of the cause-consequence data base 22 and the plant state signal are compared with each other.

When a plurality of plant states are obtained on the data translation portion 30, other technique to select such value as is not preferable for the plant than a majority decision can be used for logical decision to narrow down the states to one.

In the cause decision division 32, causes which are not contradictory each other will be outputted as a plural cause instead of concluding the cause to one only, and the ensuing processing can be done for each of them.

In the optimal operation determination division 38, the operation will not be determined to one only, those which meet the object of operation will be outputted accordingly, and the operator may have an option to select suitably from among them. Then, the processing can be cut to outputting at the point in time when those of meeting the object of operation are found more than the number set initially instead of obtaining an optimal operation.

The same one as the cause-consequence data base 22 will be used for the countermeasure data base 24, which can be identified by marking up properly for the contents.

The detail portion 42 and the example searcher portion 43 may be actuated upon indication of the operator. Then, a retrieval of analogous cases may be processed antecedently, or both may be processed concurrently, or either one only may be processed.

The predictor portion 34 can interpret an expression on the prediction data base 23 directly to execution, or it can operate for calculation by calling a subroutine for which information is stored on the prediction data base 23. Then, a table search can be done directly by the forecast feature or by a private subroutine with a similar technique.

For control of the cause decision division 32 and the optimal operation determination division 38, a similar processing can be implemented on a software by means of a stack instead of using a recursive call feature, or a function to realize the cause decision division 32 and the optimal operation determination division 38 is built on a hardware, which will be connected in series therefor by the number taken enough.

According to the embodiment given in FIG. 1, a large-scale data base is not required, which may facilitate implementation and maintenance. Then, since contents of the data base are independent at every units of configuration as shown in FIG. 2 to FIG. 6, in an extreme case, if any, where a phenomenon which is not included in the data base is produced, a trained operator will cope with such phenomenon by inputting the feature only to the data base, and thus a function of the operation guide apparatus can be amplified.

This invention can be applied to a pressurized water reactor plant, a fast breeder reactor plant and a thermal power plant, too.

According to this invention, a true cause of an abnormal state of the plant can be recognized.

What is claimed is:

1. A plant operating method comprising the steps of:
   detecting plant data from a plant;
   identifying the actual status of all members of the plant indicating an abnormality of the plant from the detected plant data;
   estimating a cause of an occurrence of the abnormality in accordance with the actual status of the plant members;
   predicting the status of all plant members after a given period of time has passed in accordance with the estimated cause;
   determining whether or not the actual status of the plant members are present in the predicted status of the plant members;
   repeatedly carrying out the step of estimating a cause of occurrence of the abnormality and predicting the status of all plant members in accordance therewith when it is determined that the actual status of all the plant members are not present in the predicted status of the plant members detected until the actual status of all the plant members come to exist in the predicted status of the plant members;
   selecting a plant operation plan for overcoming the estimated cause of occurrence of the abnormality when the actual status of all of the plant members are present in the status of the predicted plant members; and
   operating the plant according to the selected operation plan.

2. The plant operating method according to claim 1, wherein the step of estimating the cause of occurrence of the abnormality is based upon data providing a cause and effect relationship.

3. The plant operating method as defined in claim 1, wherein the step of selecting an operation plan for overcoming the estimated cause of the abnormality includes predicting the status of the plant members when the selected operation is put into practice for a given period of time, determining whether or not the selected operation plan should be selected, and repeatedly carrying out selection of an operation plan to overcome an occurrence of the predicted status of the plant members in accordance with the selected operation plan until no operation plan is selected, and thereafter selecting an operating plan which satisfies operating conditions for the plant as the selected operation plan from among the operation plans thus obtained.

4. The plant operating method according to claim 3, wherein the step of selecting an operation plan includes retrieving data indicting the operation plan corresponding to the predicted status of the plant members.

5. The plant operating method according to claim 3, including the step of determining the status of the plant members arising as a consequence of the predicted status of the plant members.

6. The plant operating method according to claim 5, wherein the status of the plant members arising as a consequence of the predicted status of the plant members is obtained by retrieving data providing a cause and effect relationship.

7. The plant operating method according to claim 1 or 3, further comprising the steps of obtaining a detail procedure for the selected operating plan and determining whether the detail procedure is contrary to the limitations on the plant operation, and carrying out the selected operation plan when the detail procedure is not contrary to limitations on the plant operation, and selecting another operation plan for overcoming the estimated cause of the abnormality when the detail procedure is contrary to the limitations on the plant operation.

* * * * *